(12) United States Patent
Carroll et al.

(10) Patent No.: US 10,180,125 B2
(45) Date of Patent: Jan. 15, 2019

(54) AIRFLOW CONFIGURATION FOR A WIND TURBINE ROTOR BLADE

(71) Applicant: General Electric Company, Schenectady, NY (US)

(72) Inventors: Christian A. Carroll, Simpsonville, SC (US); Aaron A. Yarbrough, Clemson, SC (US); Stefan Herr, Greenville, SC (US)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 14/690,726

(22) Filed: Apr. 20, 2015

(65) Prior Publication Data
US 2016/0305398 A1 Oct. 20, 2016

(51) Int. Cl.
*F03D 1/06* (2006.01)

(52) U.S. Cl.
CPC ......... *F03D 1/0675* (2013.01); *F03D 1/0633* (2013.01); *F05B 2240/301* (2013.01); *Y02E 10/721* (2013.01)

(58) Field of Classification Search
CPC ........... B64C 2711/6246; Y02E 10/721; Y02E 10/723; F03D 1/0675; F03D 1/0666;
(Continued)

(56) References Cited

U.S. PATENT DOCUMENTS

| 175,355 A | 3/1876 | King |
| 573,562 A | 12/1896 | Wittram |

(Continued)

FOREIGN PATENT DOCUMENTS

| DE | 102006043462 | 3/2008 |
| EP | 0 652 367 | 5/1995 |

(Continued)

OTHER PUBLICATIONS

European Search Report & Opinion issued in connection with corresponding EP Application No. 16165310.0 dated Aug. 17, 2016.
(Continued)

*Primary Examiner* — Logan Kraft
*Assistant Examiner* — Eric Zamora Alvarez
(74) *Attorney, Agent, or Firm* — Dority & Manning, P.A.

(57) ABSTRACT

The present disclosure is directed to a rotor blade assembly for a wind turbine. The rotor blade assembly includes a rotor blade having exterior surfaces defining pressure and suction sides, and leading and trailing edges extending in a generally span-wise direction between an inboard region and an outboard region. The inboard region includes a blade root having a rounded trailing edge. Further, the rotor blade assembly further includes at least one airflow separation element mounted to either or both of the pressure or suction sides of the rotor blade within the inboard region and adjacent to the rounded trailing edge. In addition, the at least one airflow separation element corresponds to a contour of the pressure side or the suction side of the rotor blade. As such, the at least one airflow separation element is configured to provide a fixed airflow separation location in the inboard region during standard operation.

5 Claims, 9 Drawing Sheets

(58) Field of Classification Search
CPC .. F03D 1/0641; F03D 1/0633; F05B 2240/30; F05B 2240/31; F05B 2240/301; F05B 2250/70
See application file for complete search history.

(56) References Cited

U.S. PATENT DOCUMENTS

| | | | |
|---|---|---|---|
| 1,861,065 A | 5/1932 | Poot | |
| RE19,412 E | 1/1935 | Zaparka | |
| 2,071,012 A | 2/1937 | Adams | |
| 2,126,813 A | 8/1938 | Reid | |
| 2,225,312 A | 12/1940 | Mason | |
| 2,238,749 A | 4/1941 | Peltier | |
| D131,271 S | 2/1942 | Colura | |
| 2,312,219 A | 4/1943 | Sensenich | |
| 2,469,167 A | 5/1949 | Little | |
| 2,899,128 A | 8/1959 | Vaghi | |
| 4,089,618 A | 5/1978 | Patel | |
| 4,204,629 A | 5/1980 | Bridges | |
| 4,618,313 A | 10/1986 | Mosiewicz | |
| 4,720,244 A | 1/1988 | Kluppel et al. | |
| 4,962,826 A | 10/1990 | House | |
| 5,088,665 A | 2/1992 | Vijgen et al. | |
| 5,320,491 A | 6/1994 | Coleman et al. | |
| 5,328,329 A | 7/1994 | Monroe | |
| 5,492,448 A | 2/1996 | Perry et al. | |
| 5,522,266 A | 6/1996 | Nicholson et al. | |
| 5,533,865 A | 7/1996 | Dassen et al. | |
| 5,819,357 A | 10/1998 | Gould | |
| 6,352,601 B1 | 3/2002 | Ray | |
| 6,491,260 B2 | 12/2002 | Borchers et al. | |
| 6,729,846 B1 | 5/2004 | Wobben | |
| 6,733,240 B2 | 5/2004 | Gliebe | |
| 6,779,978 B2 | 8/2004 | Camargo | |
| 6,789,769 B2 | 9/2004 | Mau et al. | |
| 6,830,436 B2 | 12/2004 | Shibata et al. | |
| 6,910,867 B2* | 6/2005 | Corten | F03D 1/0641 416/223 R |
| 6,966,758 B2 | 11/2005 | Grabau et al. | |
| 7,059,833 B2 | 6/2006 | Stiesdal et al. | |
| 7,328,770 B2 | 2/2008 | Owens et al. | |
| 7,351,041 B2 | 4/2008 | Uselton et al. | |
| 7,413,408 B1 | 8/2008 | Tafoya | |
| 7,458,777 B2 | 12/2008 | Herr | |
| 7,604,461 B2* | 10/2009 | Bonnet | F03D 1/0641 416/235 |
| 7,632,068 B2 | 12/2009 | Bak et al. | |
| 7,637,721 B2 | 12/2009 | Driver et al. | |
| 7,740,206 B2 | 6/2010 | Eaton et al. | |
| 7,828,523 B2 | 11/2010 | Bonnet | |
| 7,883,324 B2 | 2/2011 | Standish et al. | |
| 7,976,276 B2 | 7/2011 | Riddell et al. | |
| 7,976,283 B2 | 7/2011 | Huck | |
| 8,011,887 B2 | 9/2011 | Fisher et al. | |
| 8,052,394 B2* | 11/2011 | Petsche | F03D 1/0641 29/889.71 |
| 8,083,488 B2 | 12/2011 | Fritz | |
| 8,083,491 B2* | 12/2011 | Garcillan Rueda | F03D 1/0641 415/115 |
| 8,182,231 B2* | 5/2012 | Corten | F03D 1/0641 416/223 R |
| 8,192,161 B2 | 6/2012 | Baker et al. | |
| 8,226,368 B2 | 7/2012 | Standish et al. | |
| 8,267,657 B2 | 9/2012 | Huck et al. | |
| 8,317,479 B2 | 11/2012 | Vronsky et al. | |
| 8,376,703 B2 | 2/2013 | Carroll et al. | |
| 8,430,633 B2 | 4/2013 | Carroll et al. | |
| 8,834,127 B2 | 9/2014 | Giguere et al. | |
| 9,303,621 B2* | 4/2016 | Fuglsang | F03D 1/0641 |
| 2001/0008032 A1 | 7/2001 | Llewellyn-Jones et al. | |
| 2003/0175121 A1 | 9/2003 | Shibata et al. | |
| 2004/0253114 A1 | 12/2004 | Gunneskov et al. | |
| 2007/0025858 A1 | 2/2007 | Driver et al. | |
| 2007/0041823 A1 | 2/2007 | Miller | |
| 2007/0065290 A1 | 3/2007 | Herr | |
| 2007/0077150 A1 | 4/2007 | Llorente Gonzalez | |
| 2007/0294848 A1 | 12/2007 | Dumler | |
| 2008/0001363 A1 | 1/2008 | Bhate | |
| 2008/0061192 A1 | 3/2008 | Sullivan | |
| 2008/0080977 A1 | 4/2008 | Bonnet | |
| 2008/0107540 A1 | 5/2008 | Bonnet | |
| 2008/0166241 A1 | 7/2008 | Herr et al. | |
| 2008/0187442 A1 | 8/2008 | Standish et al. | |
| 2008/0298967 A1 | 12/2008 | Gil et al. | |
| 2009/0016891 A1 | 1/2009 | Parsania et al. | |
| 2009/0074585 A1 | 3/2009 | Koegler et al. | |
| 2009/0097976 A1 | 4/2009 | Driver et al. | |
| 2009/0104038 A1 | 4/2009 | Grabau | |
| 2009/0126131 A1 | 5/2009 | Delaere et al. | |
| 2009/0274559 A1 | 11/2009 | Petsche et al. | |
| 2010/0028161 A1 | 2/2010 | Vronsky et al. | |
| 2010/0068042 A1 | 3/2010 | Bruck et al. | |
| 2010/0101037 A1 | 4/2010 | Gross et al. | |
| 2010/0104436 A1 | 4/2010 | Herr et al. | |
| 2010/0329879 A1 | 12/2010 | Presz, Jr. et al. | |
| 2011/0018282 A1 | 1/2011 | Hayashi et al. | |
| 2011/0042524 A1 | 2/2011 | Hemmelgarn et al. | |
| 2011/0142637 A1 | 6/2011 | Riddell et al. | |
| 2011/0142666 A1 | 6/2011 | Drobietz et al. | |
| 2011/0223030 A1 | 9/2011 | Huck et al. | |
| 2012/0027588 A1 | 2/2012 | Carroll | |
| 2012/0027590 A1 | 2/2012 | Bonnet | |
| 2012/0134836 A1* | 5/2012 | Carroll | F03D 1/0633 416/223 R |
| 2014/0093380 A1* | 4/2014 | Drobietz | F03D 1/0641 416/228 |
| 2014/0328692 A1* | 11/2014 | Riddell | F03D 1/0675 416/236 R |
| 2014/0334938 A1* | 11/2014 | Riddell | F03D 1/0633 416/236 R |

FOREIGN PATENT DOCUMENTS

| | | |
|---|---|---|
| EP | 2028366 | 2/2009 |
| EP | 2053240 | 4/2009 |
| EP | 2138714 | 12/2009 |
| EP | 2141358 A1 | 1/2010 |
| EP | 2216545 | 8/2010 |
| EP | 2253838 | 11/2010 |
| EP | 2270312 | 1/2011 |
| EP | 2343451 A1 | 7/2011 |
| EP | 2514961 A1 | 10/2012 |
| JP | 2000120524 | 4/2000 |
| JP | 2003254225 | 9/2003 |
| WO | WO 98/21091 | 5/1998 |
| WO | WO 2004/088130 | 10/2004 |
| WO | WO 2008/035149 | 3/2008 |
| WO | WO 2008/113349 | 9/2008 |
| WO | WO 2008/131800 | 11/2008 |
| WO | WO 2009/025549 | 2/2009 |
| WO | WO 2014016326 A1 * | 1/2014 ........... F03D 1/0675 |
| WO | 2014025252 A1 | 2/2014 |

OTHER PUBLICATIONS

Risoe National Laboratory for Sustainable Energy, "Controllable Rubber Trailing Edge Flap May Ease Stress on Wind Turbine Blades". Renewable Energy World.com, pp. 1-3, Feb. 17, 2010.
Risoe National Laboratory for Sustainable Energy, "Successful Wind Tunnel Test of Controllable Rubber Trailing Edge Flap for Wind Turbine Blades". Science Daily, pp. 1-2, Feb. 19, 2010.
Risoe National Laboratory for Sustainable Energy, The Technical University of Denmark, "Flexible Trailing Edge Flap for Blades to Make Wind Power Cheaper". Science Daily, pp. 1-2, Apr. 7, 2011.

* cited by examiner

PRIOR ART

AIRFLOW CONFIGURATION FOR A WIND TURBINE ROTOR BLADE

FIELD OF THE INVENTION

The present disclosure relates in general to wind turbine rotor blades, and more particularly to improved airfoil configurations for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having a rotatable hub with one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Each rotor blade extends from the hub at a root of the blade and continues to a tip. A cross-section of the blade is defined as an airfoil. The shape of an airfoil may be defined in relationship to a chord line. The chord line is a measure or line connecting the leading edge of the airfoil with the trailing edge of the airfoil. The shape may be defined in the form of X and Y coordinates from the chord line. The X and Y coordinates generally are dimensionless. Likewise, the thickness of an airfoil refers to the distance between the upper surface and the lower surface of the airfoil and is expressed as a fraction of the chord length.

The inboard region, i.e., the area closest to the hub, generally requires the use of relatively thick foils ($30\% \le t/c \le 40\%$). The aerodynamic performance of conventional airfoil designs, however, degrades rapidly for thicknesses greater than 30% of chord largely due to flow separation concerns. For thicknesses above 40% of chord, massive flow separation may be unavoidable such that the region of the blade may be aerodynamically compromised.

In some instances, flatback airfoils may be used in the inboard region to allow for higher lift of thick airfoils but at reduced chords. Traditional flatback designs, however, can be extremely costly and complicated to manufacture.

Roundback airfoils are substantially less expensive and less complicated to manufacture than flatback airfoils. Although roundback airfoils allow the airflow to "feel" a larger trailing edge thickness (and hence the potential for increased lift performance), such airfoils can create flow separation on the curved surface that is sensitive to small details in the inflow. As such, the separation location and hence the lift from the roundback airfoil can fluctuate to an unacceptable extent.

Thus, there is a need for a new and improved airfoil configuration for a wind turbine rotor blade that addresses the aforementioned issues. More specifically, an airfoil that provides improved aerodynamic performance particularly with respect to the inboard region would be advantageous.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes a rotor blade having exterior surfaces defining a pressure side, a suction side, a leading edge, and a trailing edge each extending in a generally span-wise direction between an inboard region and an outboard region. The inboard region includes a blade root that is typically characterized by a rounded trailing edge. Further, the rotor blade assembly further includes at least one airflow separation element mounted to either or both of the pressure or suction sides of the rotor blade within the inboard region and adjacent to the rounded trailing edge. In addition, the at least one airflow separation element corresponds to a contour of the pressure side or the suction side of the rotor blade. As such, an edge of the at least one airflow separation element is configured to provide a fixed airflow separation location in the inboard region during standard operation.

In one embodiment, the rotor blade assembly includes opposing airflow separation elements, wherein one of the airflow separation elements is configured on the pressure side and the other airflow separation element is configured on the suction side. In certain embodiments, the airflow separation element(s) may include any one of or combination of the following: one or more airflow separation anchors, one or more airflow separation plates, a non-structural fairing, and/or similar.

In certain embodiments, the one or more airflow separation anchors include a proximal end and a distal end, with the proximal and distal ends being fixed to at least one of the pressure side or the suction side of the rotor blade. As such, the rounded trailing edge extends beyond the airflow separation anchor(s) in a generally chord-wise direction. Further, in particular embodiments, the airflow separation anchors may include a wedge-shaped cross-section configured to separate airflow from a corresponding surface.

In additional embodiments, the one or more airflow separation plates may include a proximal end and a distal end with the proximal end being fixed to at least one of the pressure side or the suction side of the rotor blade. In further embodiments, the distal end of the airflow separation plate is configured to align with the rounded trailing edge of the rotor blade in a generally chord-wise direction. In an alternative embodiment, the distal ends of the airflow separation plates are configured to extend beyond the rounded trailing edge of the rotor blade in a generally chord-wise direction. As such, the distal ends of the airflow separation plates create a void at the rounded trailing edge so as to mimic a flatback airfoil.

In particular embodiments, the rotor blade assembly may also include at least one structural component configured between the airflow separation plate and a corresponding surface of the rotor blade. As such, the structural component is configured to provide support to the airflow separation plate(s).

In further embodiments, the non-structural fairing may include a straight portion configured between a first end and a second end. As such, when the first end is mounted to the pressure side and the second end is mounted to the suction side of the rotor blade, the straight portion creates a flatback trailing edge of the rotor blade.

In another embodiment, the airflow separation element(s) are located from about 90% chord to about 95% chord from the leading edge of the rotor blade.

In another aspect, the present disclosure is directed to a wind turbine. The wind turbine includes a plurality of rotor blades, with each blade having exterior surfaces defining a pressure side, a suction side, a leading edge and a trailing edge each extending in a generally span-wise direction between an inboard region and an outboard region. The inboard region includes a blade root that is typically characterized by a rounded trailing edge. Further, the rotor blade assembly further includes at least one airflow separation element mounted to either or both of the pressure or suction sides of the rotor blade within the inboard region and adjacent to the rounded trailing edge. In addition, the at least one airflow separation element corresponds to a contour of the pressure side or the suction side of the rotor blade. As such, an edge of the at least one airflow separation element is configured to provide a fixed airflow separation location at a predetermined airflow separation line in the inboard region during standard operation. It should be appreciated that the airflow separation elements of the wind turbine may further include any of the features as described herein.

In yet another aspect, the present disclosure is directed to an airflow separation kit for an inboard or blade root portion of a rotor blade in a wind turbine. The airflow separation kit includes a plurality of airflow separation elements. Each of the airflow separation elements includes a proximal end and a distal end. The proximal end is configured to mount to at least one of the pressure side or the suction side of the rotor blade within the inboard region thereof and adjacent to the rounded trailing edge. In addition, each of the airflow separation elements corresponds to a contour of the pressure side or the suction side of the rotor blade. As such, each of the airflow separation elements are configured to provide a fixed airflow separation location (e.g. at an edge thereof) in the inboard region during standard operation. It should be appreciated that the airflow separation kit may further include any of the features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a rotor blade assembly for a wind turbine having an improved airfoil configuration. More specifically, the rotor blade assembly includes a rotor blade having exterior surfaces defining a pressure side, a suction side, a leading edge, and a trailing edge each extending in a generally span-wise direction between an inboard region and an outboard region. The inboard region includes the blade root and the outboard region includes the blade tip. The blade root generally includes a rounded trailing edge, i.e. a roundback airfoil, and one or more airflow separation elements attached to one or more of the blades' surfaces. As such, an edge of the at least one airflow separation element is configured to provide a fixed airflow separation location in the inboard region during standard operation. Accordingly, the combination of the roundback airfoil and the airflow separation element(s) mimic airflow of a flatback trailing edge.

The present disclosure provides many advantages not present in the prior art. For example, the combination of the roundback airfoil with the airflow separation elements significantly reduces the manufacturing difficulty and cost associated with traditional flatback airfoils. Further, the rotor blade assembly of the present disclosure reduces blade cost and weight and improves blade strength.

Figure 1:
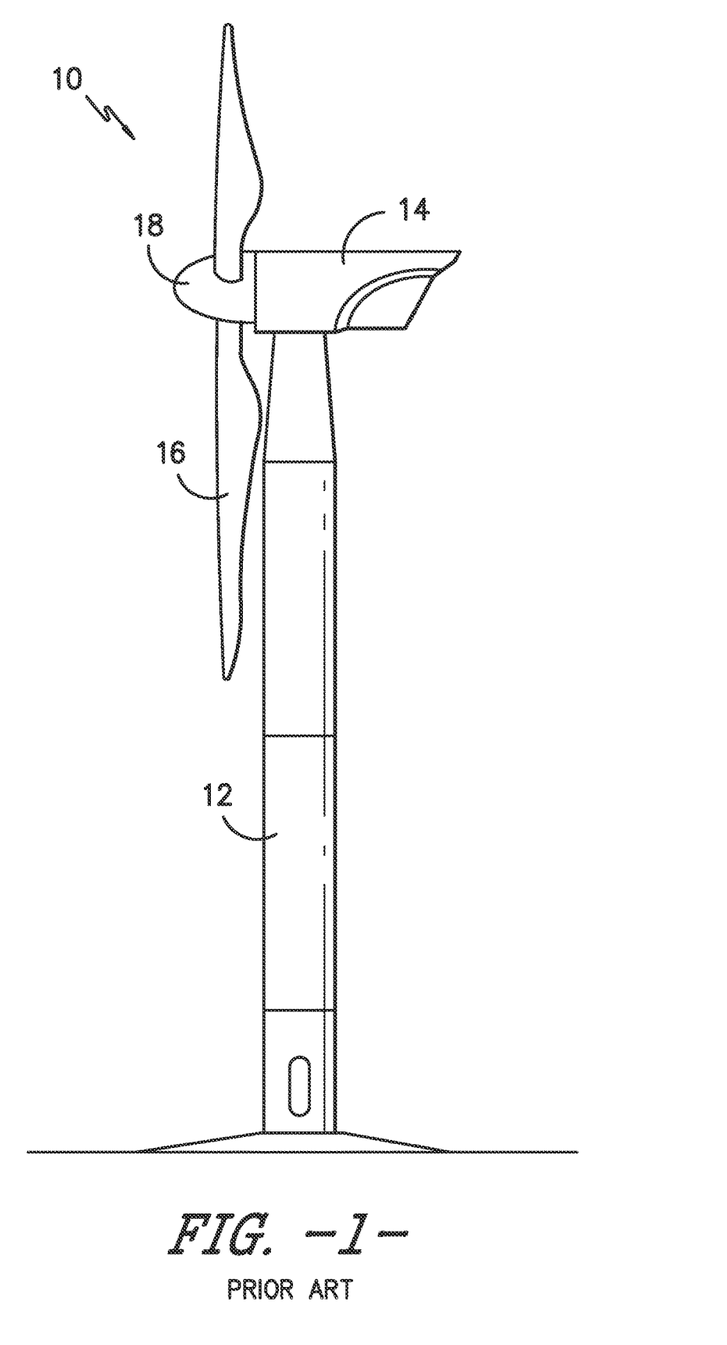
FIG. 1 illustrates a perspective view of a wind turbine according to conventional construction.

Referring now to the drawings, FIG. 1 illustrates a wind turbine 10 according to conventional construction. As shown, the wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbines, but may be utilized in any application having rotor blades.

Figure 2:
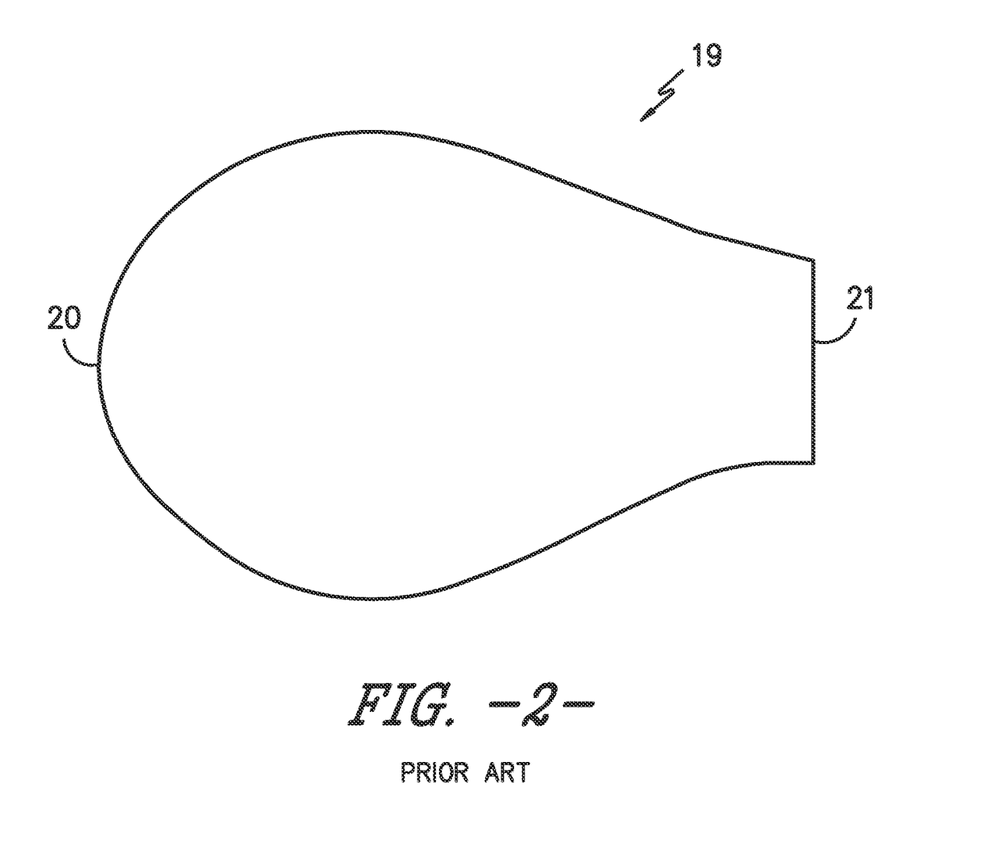
FIG. 2 illustrates a cross-sectional view of a rotor blade having a flatback configuration according to conventional construction.

FIG. 2 illustrates a cross-section of a flatback airfoil 19 according to conventional construction. As shown, the flatback airfoil 19 includes a leading edge 20 and a flat trailing edge 20 and is typically utilized in the inboard region of a rotor blade to allow for higher lift of thick airfoils at reduced chords. As mentioned, traditional flatback designs as shown in FIG. 2, however, can be extremely costly and complicated to manufacture.

As such, the present disclosure is directed to a roundback airfoil as generally illustrated in FIGS. 3-11. More specifically, as shown, a rotor blade assembly 100 according to the present disclosure includes a rotor blade 22 having exterior surfaces defining a pressure side 23, a suction side 24, a leading edge 26, and a trailing edge 28. The pressure and suction sides 23, 24 may each extend between the leading edge 26 and the trailing edge 28. Further, the exterior surfaces extend between an inboard region 36 and an outboard region 38 in a generally span-wise direction. The inboard region 36 includes the blade root 34 and the outboard region 38 includes the blade tip 32. The pressure and suction sides 23, 24, as well as the leading and trailing edges 26, 28, are generally aerodynamic surfaces having aerodynamic contours, as is generally known in the art. More specifically, as shown in FIGS. 6-12, portions of the trailing edge 28, e.g. in the inboard region 36, have been shortened and rounded to form a rotor blade 22 having a smaller cross-sectional area with a rounded or roundback configuration.

Figure 3:
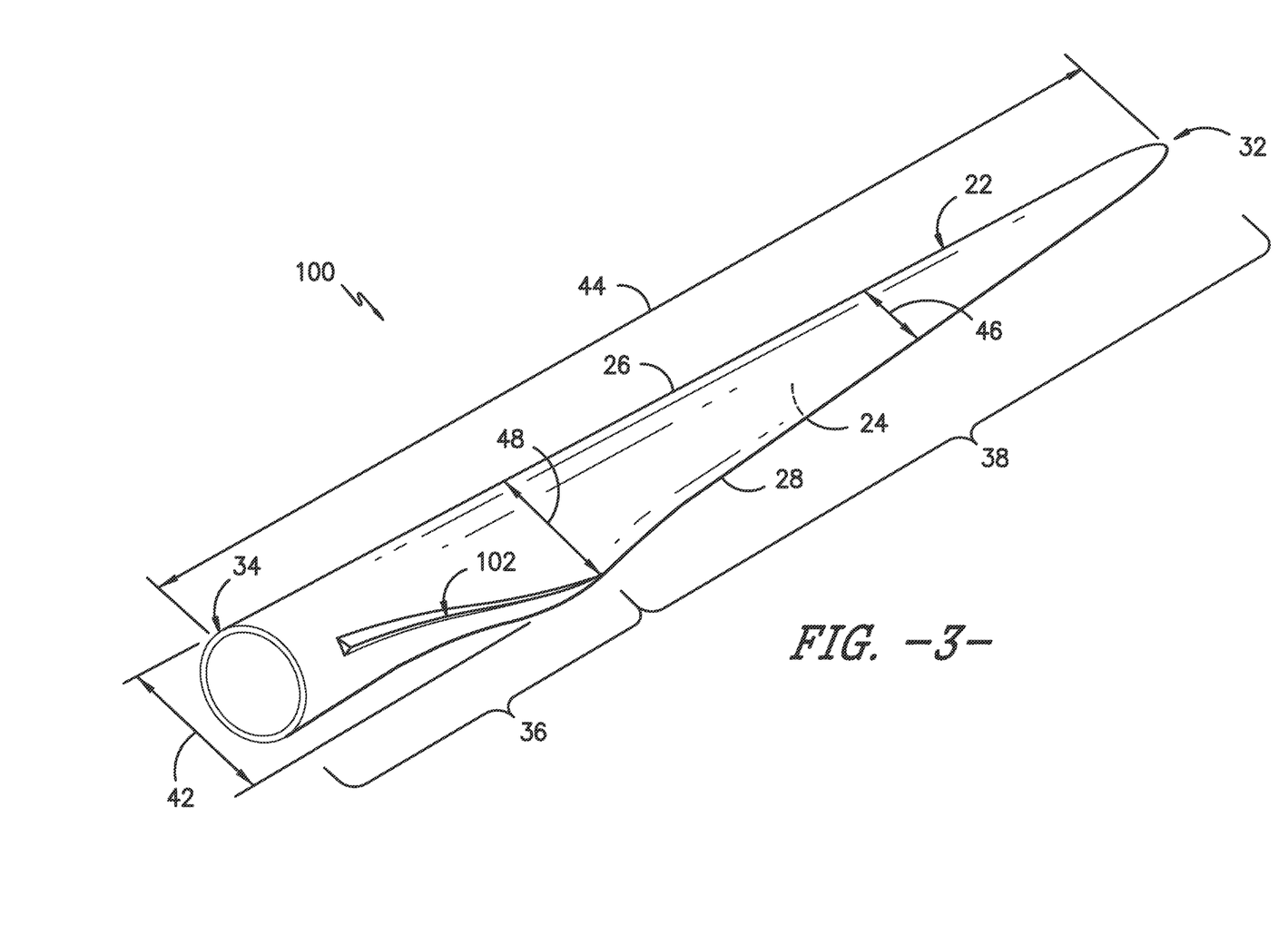
FIG. 3 illustrates a perspective view of one embodiment of a rotor blade assembly, particularly illustrating an airflow separation element at an inboard location of the rotor blade according to the present disclosure.
Figure 4:
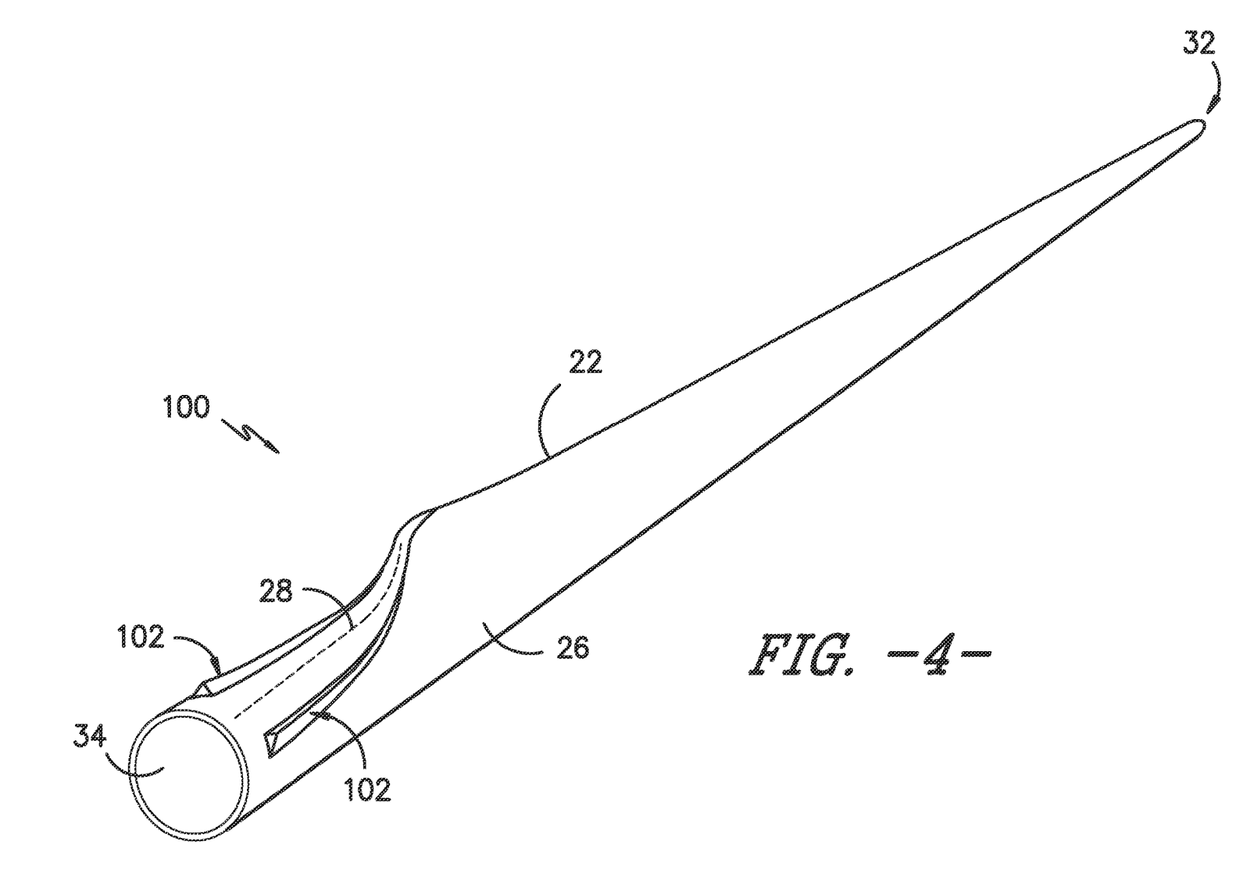
FIG. 4 illustrates another perspective view of the embodiment of FIG. 3, particularly illustrating opposing airflow separation elements at an inboard location of the rotor blade according to the present disclosure.

Referring particularly to FIG. 3, the rotor blade 22 may further define a chord 42 and a span 44 extending in chord-wise and span-wise directions, respectively. Further, as shown, the chord 42 may vary throughout the span 44 of the rotor blade 22. Thus, as discussed below, a local chord 46 may be defined for the rotor blade 22 at any point on the rotor blade 22 along the span 44. Further, the rotor blade 22 may define a maximum chord 48, as shown.

One or more structural components may also be included within the rotor blade 22 to provide structural support to the rotor blade 22. For example, FIGS. 5-11 illustrate a shear web 62 extending between two spar caps 64. The shear web 62 and spar caps 64 may extend through the rotor blade 22 or any portion thereof in the generally span-wise direction. The external surfaces defining the pressure side 23 and suction side 24 may include, or may cover, the spar caps 64.

As illustrated in FIGS. 3 through 11, the rotor blade assembly 100 includes at least one airflow separation element 102. The airflow separation element(s) 102 is configured to provide a fixed airflow separation location in the inboard region 36 during standard operation. For example, in certain embodiments, the airflow separation element(s) 102 may be located from about 90% chord to about 95% chord from the leading edge 26 of the rotor blade 22. Further, the airflow separation element(s) 102 may extend through any suitable span-wise portion of the rotor blade 22, and may thus have any suitable length relative to the span 44. For example, the airflow separation element(s) 102 may extend from the root 34 towards the tip 32 as shown in FIG. 3. By fixing the location of airflow separation in the inboard region 36 of the rotor blade 22, the airflow separation element(s) 102 may augment the lift capacity, reduce the drag, and/or augment the lift to drag ratio of the rotor blade 22 during standard operation.

Figure 5:
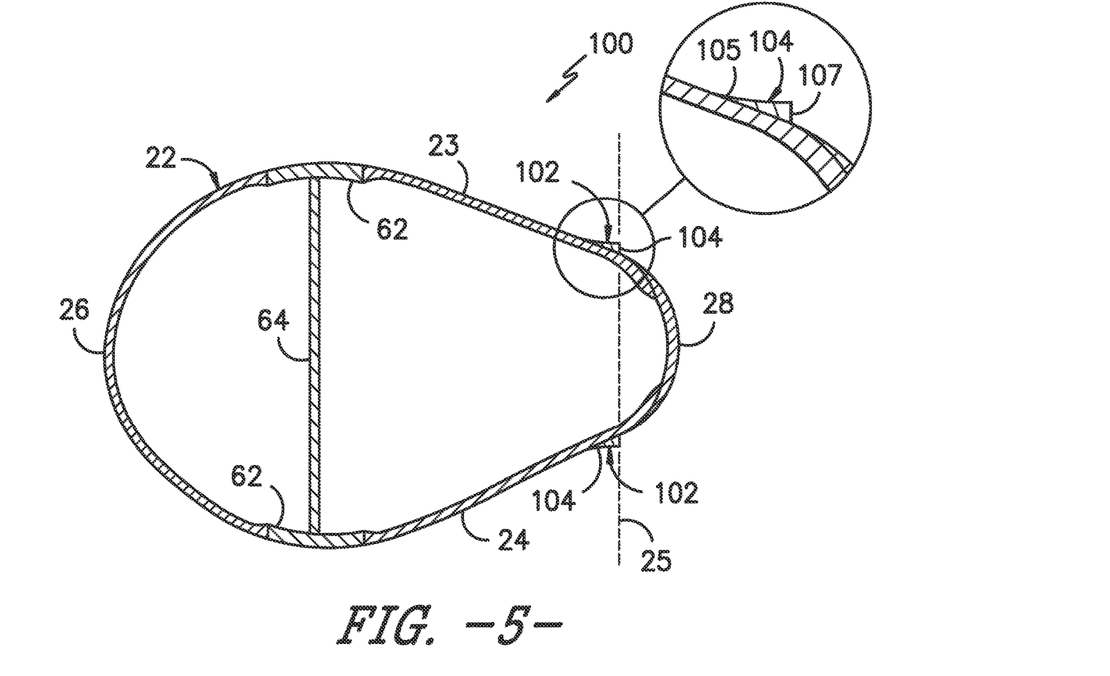
FIG. 5 illustrates a cross-sectional view of one embodiment of a rotor blade assembly, particularly illustrating opposing airflow separation elements according to the present disclosure.
Figure 6:
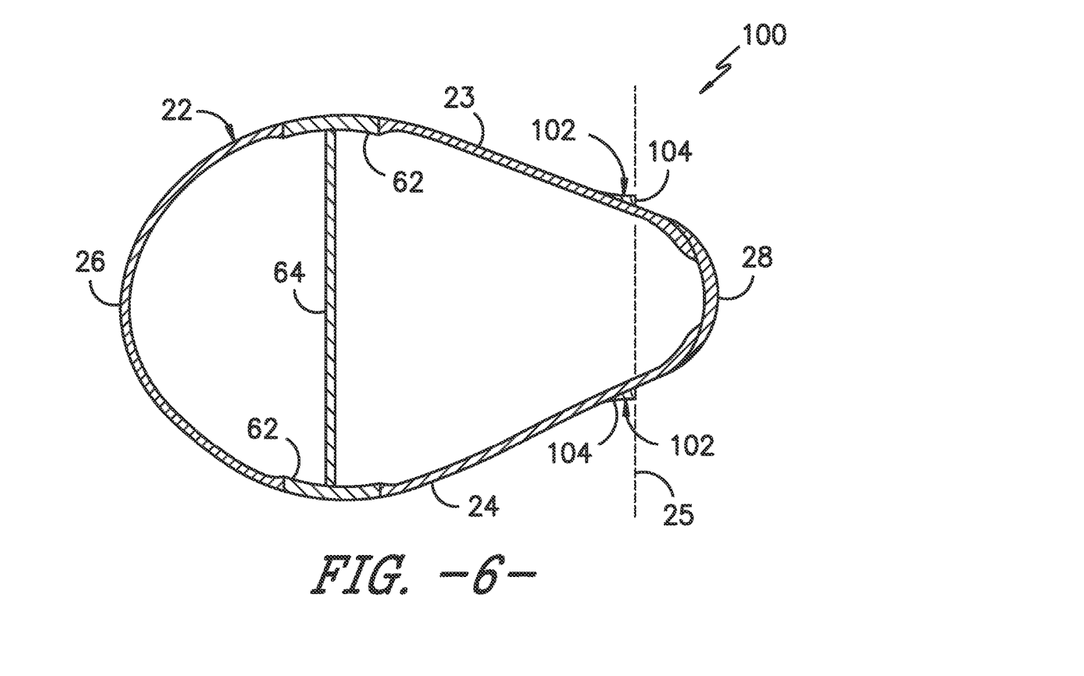
FIG. 6 illustrates a cross-sectional view of another embodiment of a rotor blade assembly, particularly illustrating opposing airflow separation elements according to the present disclosure.
Figure 8:
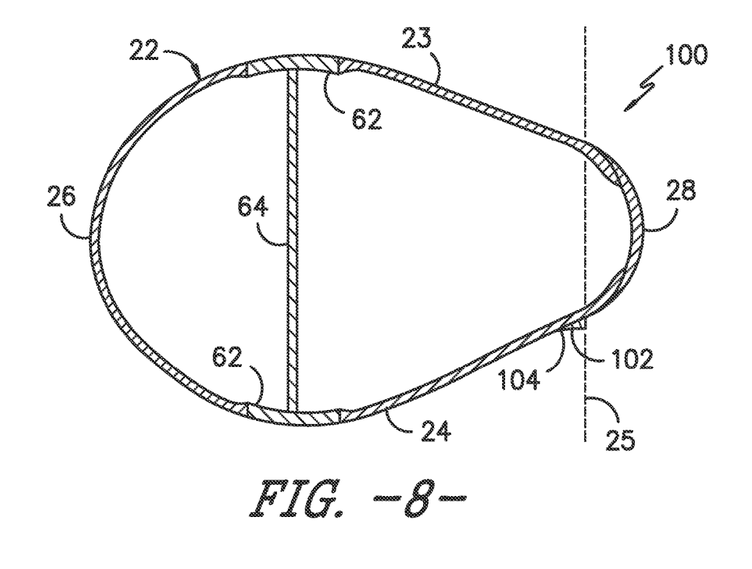
FIG. 8 illustrates a cross-sectional view of yet another embodiment of a rotor blade assembly, particularly illustrating an airflow separation element mounted to a suction side of a rotor blade according to the present disclosure.

The airflow separation element(s) 102 may include any suitable elements configured to separate airflow from a surface of the blade 22. For example, in certain embodiments, the airflow separation element(s) 102 may include one or more airflow separation anchors 104, one or more airflow separation plates 106, or a non-structural fairing 110. For example, as shown in FIGS. 5, 6, and 8, the airflow separation element(s) 102 correspond to one or more flow separation anchors 104. More specifically, as shown in the illustrated embodiments of FIGS. 5 and 6, the rotor blade 22 includes opposing flow separation anchors 104 on each of the pressure and suction sides 23, 24. FIG. 5 illustrates opposing airflow separation anchors 104 mounted to a truncated rotor blade 22, whereas FIG. 6 illustrates opposing airflow separation anchors 104 mounted to a standard rotor blade 22. The flow separation anchors 104 are typically designed to include an aerodynamic contour that matches the aerodynamic surface of the pressure and suction sides 23, 24. For example, in some embodiments, the outer surfaces of the flow separation anchors 104 may define a generally continuous aerodynamic surface with an exterior surface, such as the pressure side 23 or suction side 24, of the rotor blade 22. A generally continuous aerodynamic surface is a surface that has a generally continuous aerodynamic contour. Thus, when two surfaces define a generally continuous aerodynamic surface, there is relatively little interruption in the aerodynamic contour at the intersection of the two surfaces.

Referring to FIG. 5 (inset), the airflow separation anchors 104 generally include a proximal end 105 and a distal end 107, with the proximal and distal ends 105, 107 being mounted to either or both of the pressure or suction sides 23, 24 of the rotor blade 22. In such an embodiment, the rounded trailing edge 28 is configured to extend beyond the airflow separation anchor(s) 104 in a generally chord-wise direction. Further, as shown, the distal ends 107 or edges of the airflow separation anchors 104 define an airflow separation line 25. As such, since the distal ends 107 of the airflow separation anchors 104 align along the airflow separation line, the airfoil mimic a flatback airfoil during operation.

In addition, as shown, the airflow separation anchors 104 typically include a wedge-shaped cross-section having a substantially flat distal end 107. As such, when mounted to the rotor blade 22, the airflow separation anchors 104 are configured to mimic a flatback airfoil.

Figure 7:
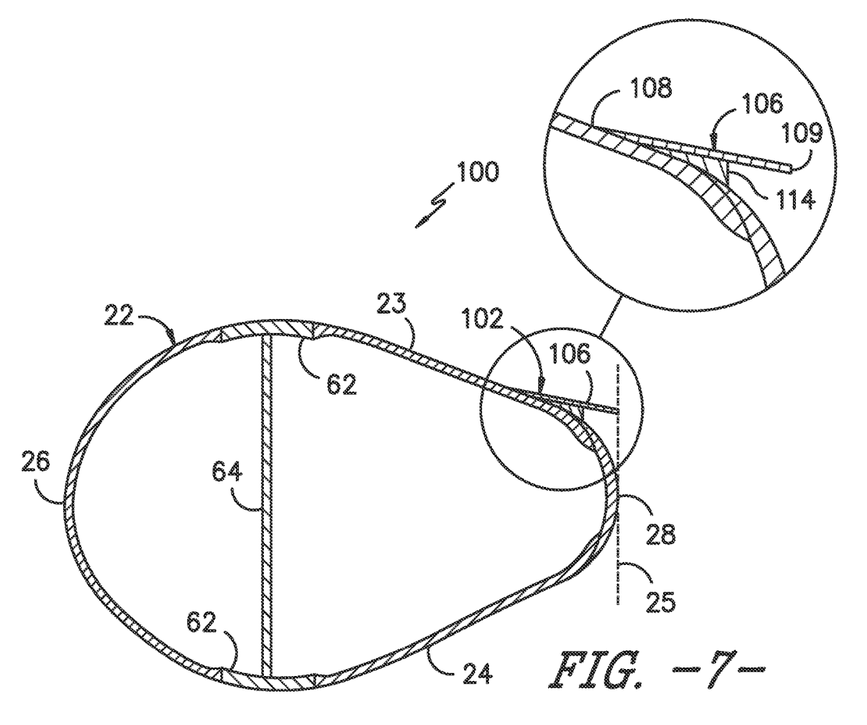
FIG. 7 illustrates a cross-sectional view of still another embodiment of a rotor blade assembly, particularly illustrating an airflow separation element mounted to a pressure side of a rotor blade according to the present disclosure.
Figure 9:
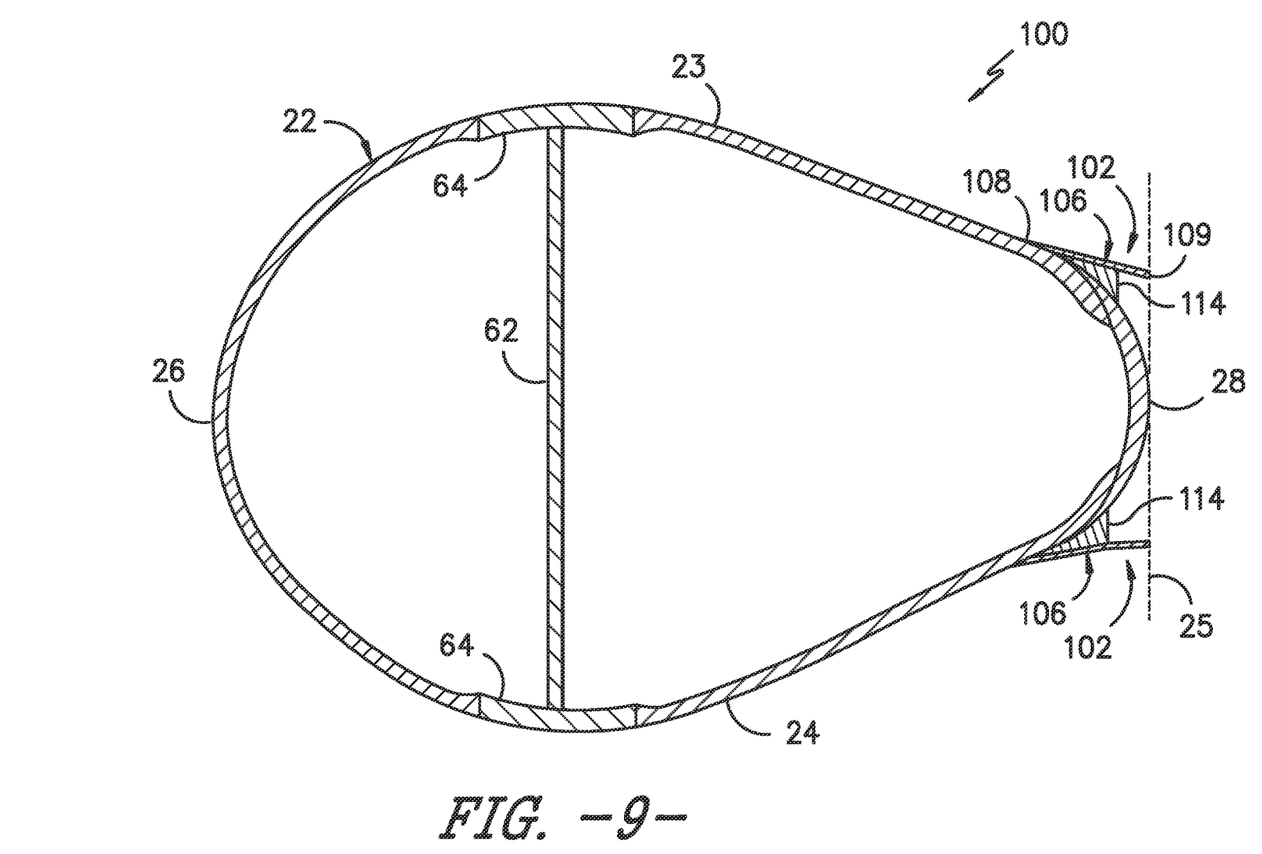
FIG. 9 illustrates a cross-sectional view of a further embodiment of a rotor blade assembly, particularly illustrating opposing airflow separation elements mounted to pressure and suction sides of a rotor blade according to the present disclosure.
Figure 11:
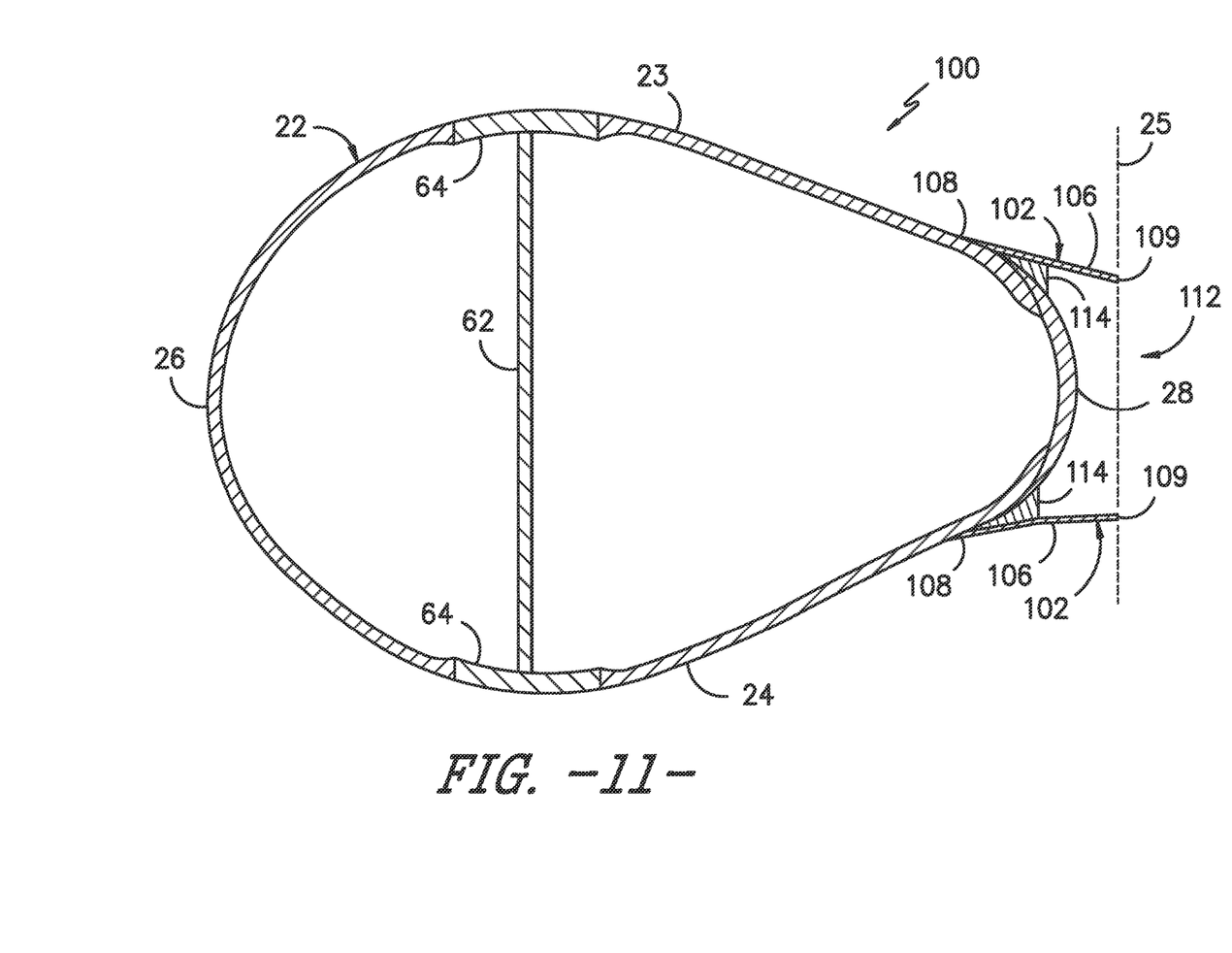
FIG. 11 illustrates a cross-sectional view of yet another embodiment of a rotor blade assembly, particularly illustrating opposing airflow separation elements mounted to pressure and suction sides of a rotor blade according to the present disclosure.

In additional embodiments, as shown in FIGS. 7, 9, and 11, the airflow separation element(s) 102 may also include one or more airflow separation plates 106. More specifically, as shown in FIG. 7 (inset), the airflow separation plate(s) 106 may include a proximal end 108 and a distal end 109. The proximal end 108 may be the end that is mounted to either or both of the pressure or suction sides 23, 24 of the rotor blade 22, whereas the distal end 109 may be the end that is not mounted to the rotor blade 22. For example, as shown, the proximal end 108 of the airflow separation plate 106 is mounted to the pressure side 23 of the rotor blade 22, whereas the distal end 109 extends from the pressure side 23 of the rotor blade 22. In additional embodiments, as shown in FIGS. 9 and 11, the rotor blade 22 includes opposing airflow separation plates 106 with the proximal ends 108 mounted to the pressure and suction sides 23, 24 of the rotor blade 22, respectively. In various embodiments, the proximal ends 108 may be mounted through the use of, for example, a suitable adhesive or a suitable brazing or welding technique, or may be mounted through the use of, for example, suitable mechanical fasteners such as screws, nails, rivets, nut-bolt combinations, etc.

Further, as shown in FIGS. 7 and 9, in certain embodiments, when the proximal end(s) 108 of the airflow separation plate(s) 106 is mounted to the rotor blade 22, the distal end(s) 109 substantially aligns with or is shorter than the rounded trailing edge 28 of the rotor blade 22 in a generally chord-wise direction. Accordingly, the distal ends 109 of the airflow separation plates 106 define a fixed airflow separation line 25.

In an alternative embodiment, as shown in FIG. 11, the distal ends 109 of the airflow separation plates 106 may extend beyond the rounded trailing edge 28 of the rotor blade 22 in a generally chord-wise direction when the proximal end(s) 108 of the airflow separation plate(s) 106 is mounted to the rotor blade 22. Accordingly, the airflow separation plates 106 extend to a flow separation line 25 beyond the rounded trailing edge 28 in a chord-wise direction. In such an embodiment, the distal ends 109 of the opposing airflow separation plates 106 create a void 112 therebetween.

In particular embodiments, the rotor blade assembly 100 may also include at least one structural component 114 configured between the airflow separation plate(s) 106 and the corresponding surface 23, 24 of the rotor blade 22. The structural component 114 may be, for example, rods, wedges, or webs, or any other suitable components that provide structural support. For example, as shown in FIGS. 7, 9, and 11, the structural component 114 may include a wedge configured between the airflow separation plate(s) 106 and either the pressure or suction sides 23, 24 of the rotor blade 22. The structural component(s) 114 may extend at any suitable direction and at any suitable location between the airflow separation plate(s) 106 and either the pressure or suction sides 23, 24 of the rotor blade 22. Further, a single structural component(s) 114 may extend along a suitable portion of the span 44 of the rotor blade 22, and/or a plurality of structural component(s) 114 may be disposed and spaced apart along the span 44 of the rotor blade 22 or any portion thereof. As such, the structural component(s) 114 is configured to provide support to the airflow separation plate(s) 106 when mounted to the rotor blade 22 so as to maintain the airflow separation plate(s) 106 at a desired location.

Figure 10:
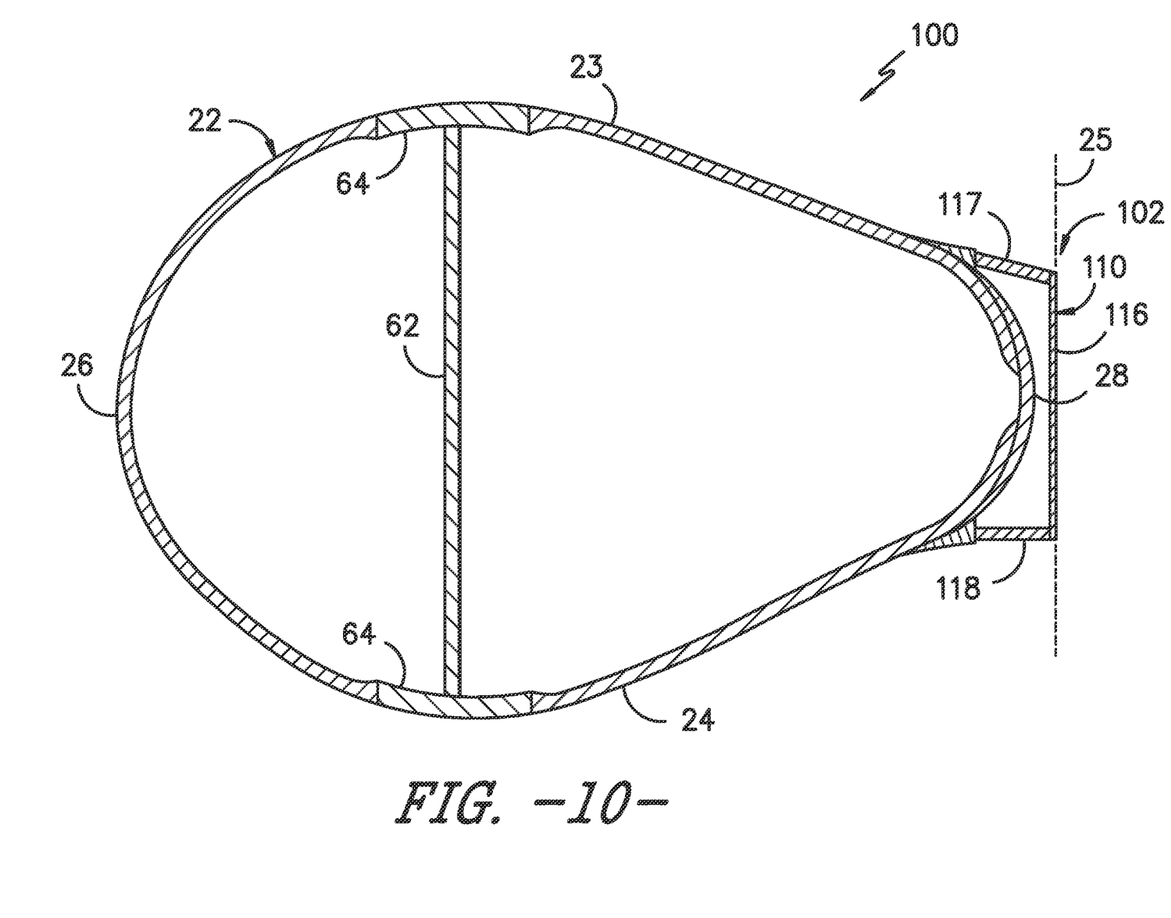
FIG. 10 illustrates a cross-sectional view of still another embodiment of a rotor blade assembly, particularly illustrating an airflow separation element mounted to a rotor blade according to the present disclosure.

In still further embodiments, as shown in FIG. 10, the airflow separation element(s) 102 may include a non-structural fairing 110 configured with the rounded trailing edge 28 of the rotor blade 22. As shown, the non-structural fairing 110 typically includes a straight portion 116 configured between a first end 117 and a second end 118. As such, when the first end 117 is mounted to the pressure side 23 and the second end 118 is mounted to the suction side 24 of the rotor blade 22, the straight portion 116 creates a flatback trailing edge of the rotor blade 22 that aligns with flow separation line 25, as shown in FIG. 10. Accordingly, the fairing 110 provides a flow separation line 25 that extends beyond the rounded trailing edge 28 in a chord-wise direction.

Each airflow separation element(s) 102 according to the present disclosure may be formed from any suitable materials. For example, the material utilized to form the airflow separation element(s) 102 may preferably be lightweight, and may further preferably be suitably rigid to maintain its structure during use in a wind turbine 10. More specifically, the airflow separation element(s) 102 may be formed from fiberglass, aluminum, or any other suitable material.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:
a rotor blade having exterior surfaces defining a pressure side, a suction side, a leading edge, and a trailing edge each extending in a generally span-wise direction between an inboard region and an outboard region, the inboard region comprising a rounded trailing edge; and,
separate and opposing airflow separation elements, the opposing airflow separation elements comprising airflow separation plates, one of the airflow separation plates mounted to the pressure side of the rotor blade and another of the airflow separation plates mounted to the suction side of the rotor blade within the inboard region and adjacent to the rounded trailing edge, each of the airflow separation plates comprising a chord-wise length defined by a proximal end and a distal end, the chord-wise length extending in a chord-wise direction of the rotor blade, the chord-wise length being completely located within a chord of the rotor blade,
wherein the opposing airflow separation plates correspond to a contour of the pressure side and the suction side of the rotor blade, respectively, and
wherein the distal ends of the opposing airflow separation plates on the pressure side and the suction side of the rotor blade provide a fixed airflow separation location in the inboard region during standard operation that aligns with the rounded trailing edge of the rotor blade in a vertical direction, and further comprising at least one structural component configured between the airflow separation plates and a corresponding surface of the rotor blade.

2. The rotor blade assembly of claim 1, wherein the proximal ends of the airflow separation elements are fixed to one of the pressure side or the suction side of the rotor blade.

3. The rotor blade assembly of claim 1, wherein the at least one structural component comprises at least one of a rod, a wedge, or a web.

4. The rotor blade assembly of claim 1, further comprises a plurality of structural components spaced apart along a span of the rotor blade.

5. The rotor blade assembly of claim 1, wherein the opposing airflow separation elements are located from about 90% chord to about 95% chord from the leading edge of the rotor blade.

* * * * *